(12) United States Patent
Igarashi

(10) Patent No.: US 8,245,089 B2
(45) Date of Patent: Aug. 14, 2012

(54) TRANSMISSION DEVICE, IMAGE DATA TRANSMISSION SYSTEM AND TRANSMISSION METHOD

(75) Inventor: Masatomo Igarashi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1441 days.

(21) Appl. No.: 11/819,090

(22) Filed: Jun. 25, 2007

(65) Prior Publication Data

US 2008/0123773 A1  May 29, 2008

(51) Int. Cl.
   *G06F 11/00* (2006.01)
(52) U.S. Cl. .. 714/712; 358/1.15; 358/1.14; 358/426.09
(58) Field of Classification Search .................. None
   See application file for complete search history.

(56) References Cited

U.S. PATENT DOCUMENTS

| | | | |
|---|---|---|---|
| 5,701,505 A * | 12/1997 | Yamashita et al. | 712/11 |
| 5,822,508 A * | 10/1998 | Ohara | 358/1.15 |
| 6,856,412 B1 * | 2/2005 | Kaneko | 358/1.14 |
| 7,240,251 B2 * | 7/2007 | Popescu | 714/704 |
| 7,408,669 B2 * | 8/2008 | Kaneko | 358/1.15 |
| 7,440,702 B2 * | 10/2008 | Imai | 398/141 |
| 2004/0012580 A1 * | 1/2004 | Yamagishi et al. | 345/204 |
| 2005/0063707 A1 * | 3/2005 | Imai | 398/141 |
| 2006/0285140 A1 * | 12/2006 | Ehara | 358/1.13 |

FOREIGN PATENT DOCUMENTS

| | | |
|---|---|---|
| JP | A-09-006650 | 1/1997 |
| JP | A 2005-303600 | 10/2005 |
| JP | A 2005-303604 | 10/2005 |
| JP | A 2006-091989 | 4/2006 |
| JP | A 2006-093968 | 4/2006 |
| JP | A 2006-303626 | 11/2006 |

OTHER PUBLICATIONS

Office Action issued in Japanese Application No. 2006-316649 dated Jun. 8, 2011 (with translation).

* cited by examiner

*Primary Examiner* — Christopher McCarthy
(74) *Attorney, Agent, or Firm* — Oliff & Berridge, PLC

(57) ABSTRACT

A transmission device includes: a storage unit that holds test data used for checking occurrence/nonoccurrence of a communication abnormality; a serial conversion unit that converts image data to be transmitted and the test data stored in the storage unit into serial data; a transmission unit that transmits the serial data converted by the serial conversion unit to a reception device; and an initialization unit that, when an instruction of particular initialization is inputted, performs initialization on other circuits than the storage unit without performing initialization on the storage unit.

7 Claims, 5 Drawing Sheets

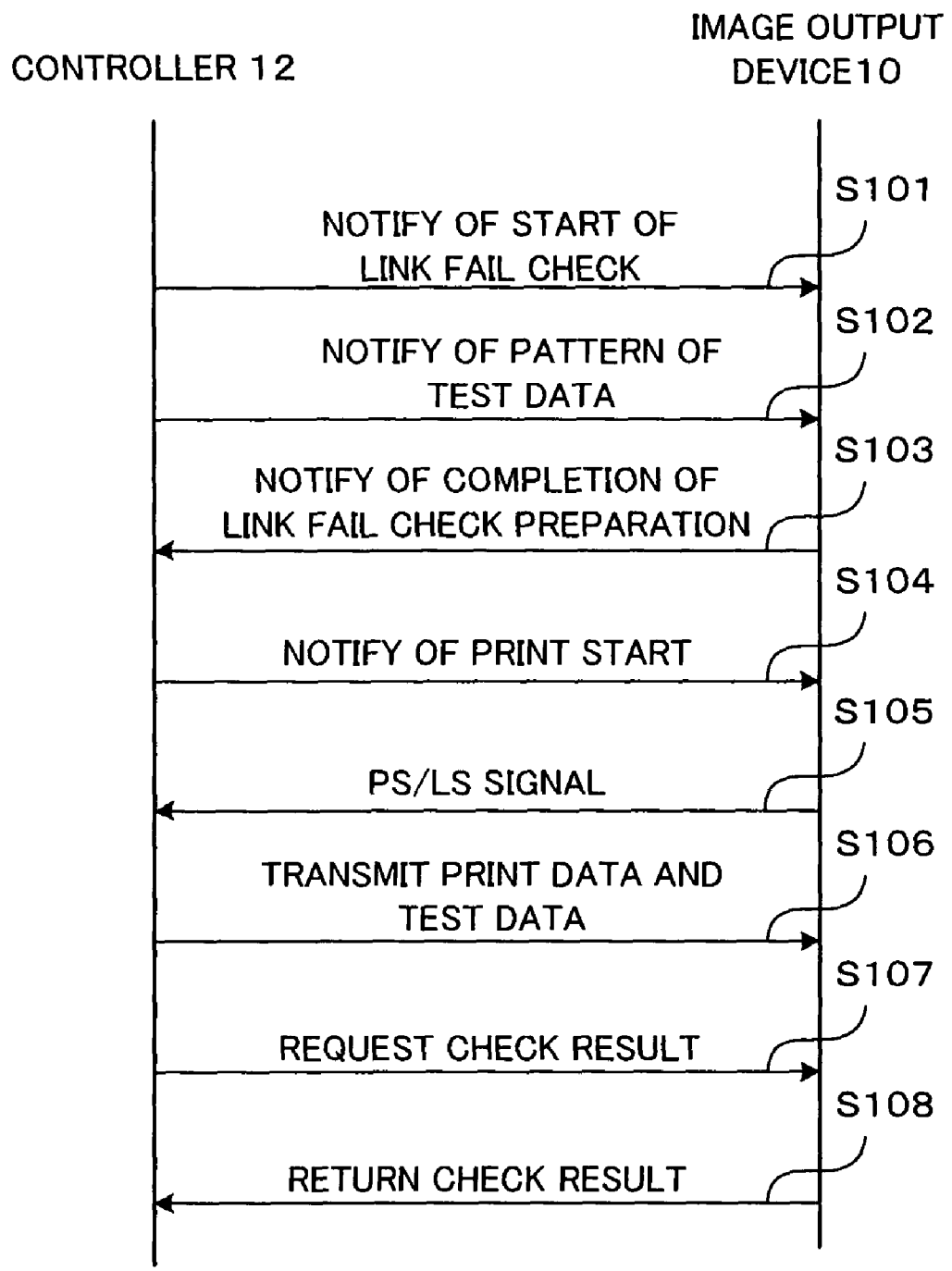

TRANSMISSION DEVICE, IMAGE DATA TRANSMISSION SYSTEM AND TRANSMISSION METHOD

CROSS-REFERENCE TO RELATED APPLICATIONS

This application is based on and claims priority under 35 USC 119 from Japanese Patent Application No. 2006-316649 filed Nov. 24, 2006.

BACKGROUND

1. Technical Field

The present invention relates to a transmission device, an image data transmission system and a transmission method for transmitting image data.

2. Related Art

In an image forming system, in which image formation is performed based on designated image data, a controller to perform image processing to generate print image data and an image output device to output an image based on the generated image data are independent units. In this image forming system, the controller transmits image data, and the image output device receives the image data from the controller and performs image output such as printing. Accordingly, it is necessary to establish connection between the controller and the image output device by some communication method.

As the simplest communication method, parallel communication in which the number of bits corresponds to the data width of image data may be used. However, when connection between the controller and the image output device is established by use of the parallel communication, the number of connections is increased.

Accordingly, there is proposed an image forming system in which connection is established between such controller and image output device by serial communication.

By use of this serial communication, the number of connections between the controller and the image output device can be reduced. However, when the same data amount of information is transmitted, the transmission rate in the serial communication is higher in comparison with that in the parallel communication. In the image forming system in which connection is established between the controller and the image output device by serial communication, there is a high probability that an abnormality occurs in image data due to communication abnormality caused by the influence of noise or the like.

To prevent this problem, there is proposed an image transmission/reception system in which abnormality detection is performed to determine whether or not a communication abnormality has occurred between the controller and the image output device using test data having a preset pattern. In this image transmission/reception system, the test data is transmitted from the controller to the image output device by a method not interrupting image data transmission/reception and the test data received on the image output device side is checked, thereby occurrence/nonoccurrence of communication abnormality is determined.

According to the disclosed image transmission/reception system, when an abnormality is detected in the test data received on the image output device side, it is determined that some abnormality has occurred in the serial communication between the controller and the image output device, and abnormality processing such as stoppage of image output can be performed. Accordingly, the reliability of an outputted image can be increased by such abnormality detection.

However, when some abnormality occurs on the controller side or reset by software (hereinbelow, referred to as "software reset") is performed for the sake of control, the test data stored in a register on the controller side is initialized. In this case, the test data outputted from the controller side does not correspond with the test data stored on the image output device side. As a result, the abnormality processing such as stoppage of image output is performed on the image output device side even though no communication abnormality has occurred.

To prevent such erroneous detection, a valid bit indicating validity/invalidity of test data may be added to the test data. In the image output device, when the valid bit indicates invalidity of the test data, determination of occurrence/nonoccurrence of communication abnormality is not performed. However, in this method using the valid bit, a problem may occur when software reset is performed on the controller side. For example, when the valid bit is reset after the reset of the test data, the valid bit indicates validity of the test data for some period even though the test data has been reset. In this case, there is a probability of erroneous detection as occurrence of communication abnormality in the image output device. Further, when the valid bit is reset before the reset of the test data, the erroneous detection as occurrence of communication abnormality is not made, but the communication abnormality detection using the test data is not performed. In this case, even when a communication abnormality has really occurred, detection is not performed.

SUMMARY

According to an aspect of the invention, there is provided a transmission device including: a storage unit that holds test data used for checking occurrence/nonoccurrence of a communication abnormality; a serial conversion unit that converts image data to be transmitted and the test data stored in the storage unit into serial data; a transmission unit that transmits the serial data converted by the serial conversion unit to a reception device; and an initialization unit that, when an instruction of particular initialization is inputted, performs initialization on other circuits than the storage unit without performing initialization on the storage unit.

BRIEF DESCRIPTION OF THE DRAWINGS

An exemplary embodiment of the present invention will be described in detail based on the following figures, wherein:

FIG. 5 is a sequence flowchart showing operations between the controller 12 and the image output device 10 when link fail check is performed.

DETAILED DESCRIPTION

Figure 1:
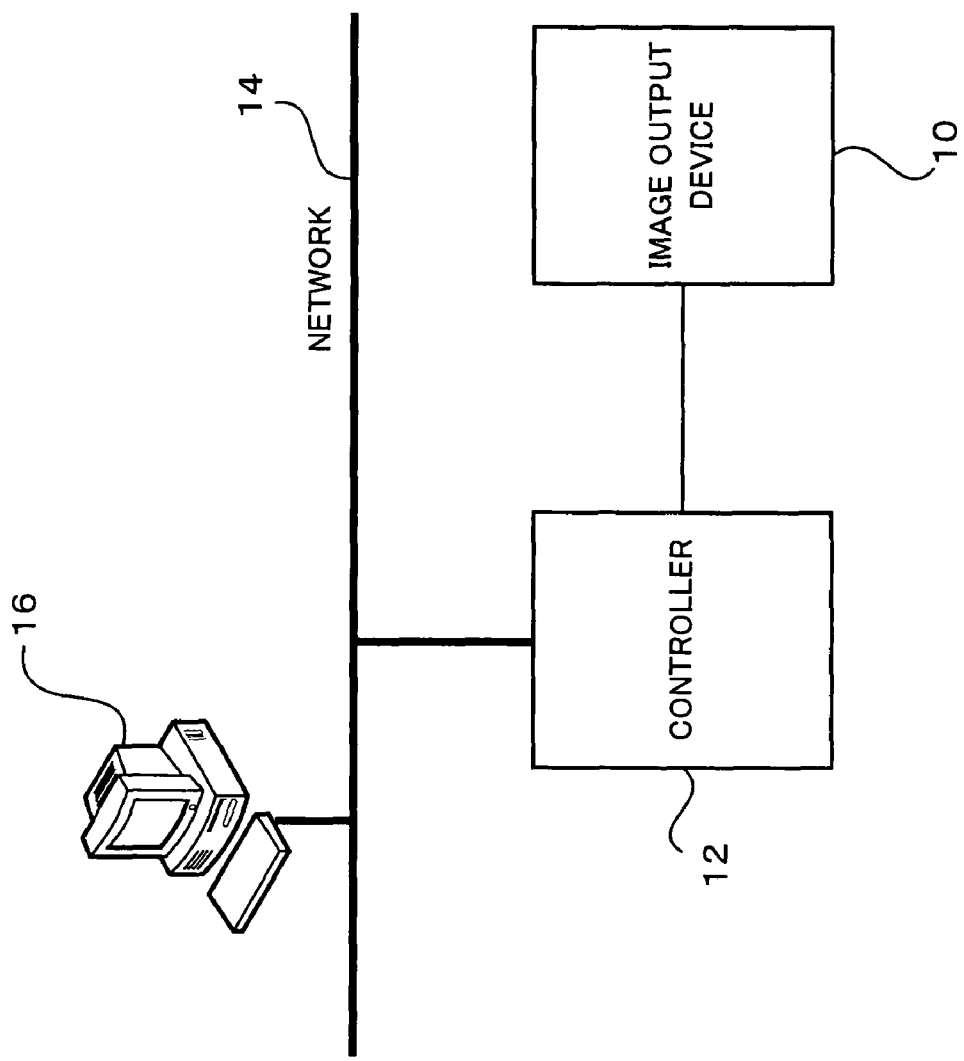
FIG. 1 is a block diagram showing the configuration of an image forming system according to an exemplary embodiment of the present invention.

Next, an exemplary embodiment of the present invention will be described in detail based on the drawings. FIG. 1 is a block diagram showing the configuration of an image forming system according to the exemplary embodiment of the present invention.

As shown in FIG. 1, the image forming system according to the exemplary embodiment has an image output device 10, a controller 12 and a terminal device 16. The terminal device 16 and the controller 12 are interconnected via a network 14. Further, the controller 12 and the image output device 10 are interconnected by serial communication.

The terminal device 16 generates print data such as a print job and transmits the print data to the controller 12. The controller 12 receives the print data transmitted from the terminal device 16, generates image data corresponding to the print data, and transmits the image data to the image output device 10. The image output device 10 forms an image based on the image data from the controller 12 and outputs the image on a print sheet.

Figure 2:
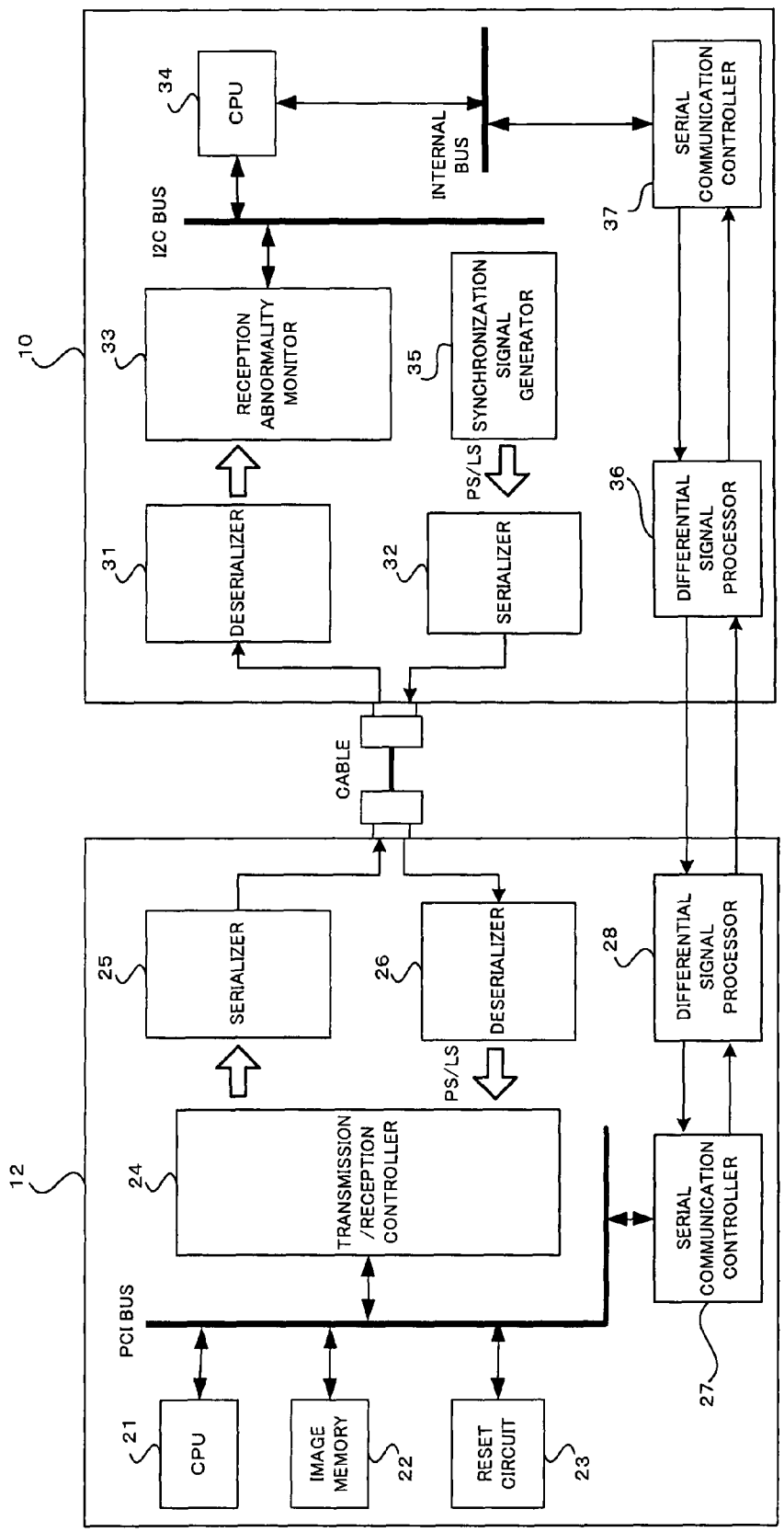
FIG. 2 is a block diagram showing the configurations of a controller 12 and an image output device 10.

Next, FIG. 2 shows the configurations of the controller 12 and the image output device 10 in FIG. 1. The controller 12 and the image output device 10 are interconnected via a cable for serial communication.

As shown in FIG. 2, the controller 12 has a CPU 21, an image memory 22, a reset circuit 23, a transmission/reception controller 24, a serializer 25, a deserializer 26, a serial communication controller 27, and a differential signal processor 28.

The CPU 21, the image memory 22, the reset circuit 23, the transmission/reception controller 24 and the serial communication controller 27 are interconnected via a PCI (Peripheral Component Interconnect) bus.

The CPU 21 performs predetermined processing based on a program stored in a storage device (not shown) or the like to control the operation of the controller 12.

The image memory 22 is used for storing image data to be print-outputted, i.e., image data to be transmitted to the image output device 10.

The reset circuit 23 performs power-on reset to detect starting of a power source or the like and perform initialization.

The transmission/reception controller 24 controls data transmitted/received between the controller 12 and the image output device 10.

The serializer 25 receives data to be transmitted to the image output device 10, as parallel data, from the transmission/reception controller 24, then serializes the parallel data into serial data, and outputs the serial data to the image output device 10. Note that the serializer 25 includes a transmission unit to transmit the converted serial data to the image output device 10.

The deserializer 26 converts serial data transmitted from the image output device 10 into parallel data.

The differential signal processor 28 performs processing on a differential signal transmitted/received to/from the image output device 10. The serial communication controller 27 performs control on serial communication for transmission/reception between the controller 12 and the image output device 10, issuance of instruction regarding printing, hand shaking for execution of various test modes, and the like, based on signals processed by the differential signal processor 28.

Further, the image output device 10 has a deserializer 31, a serializer 32, a reception abnormality monitor 33, a CPU 34, a synchronization signal generator 35, a differential signal processor 36 and a serial communication controller 37.

Note that, although not shown, the image output device 10 is provided with a print engine for performing printing based on image data transmitted from the controller 12 side.

The deserializer 31 converts serial data transmitted from the controller 12 into parallel data.

The reception abnormality monitor 33 determines occurrence/nonoccurrence of communication abnormality by comparing a pattern of test data in the parallel data converted by the deserializer 31 with a preset pattern.

The CPU 34 performs predetermined processing based on a program stored in a storage device (not shown) or the like to control the operation of the image output device 10.

In accordance with progress of printing operation by the print engine (not shown), the synchronization signal generator 35 generates a PS (Page Synchronization)/LS (Line Synchronization) signal to indicate timing of image data transmission for the controller 12.

The serializer 32 receives the data such as the PS/LS signal generated by the synchronization signal generator 35, as parallel data, serializes the parallel data into serial data, and outputs the serial data to the controller 12.

The differential signal processor 36 performs processing on a differential signal transmitted/received to/from the controller 12. The serial communication controller 37 performs control on serial communication for transmission/reception between the controller 12 and the image output device 10, issuance of instruction regarding printing, hand shaking for execution of various test modes, and the like, based on signals processed by the differential signal processor 36.

Figure 3:
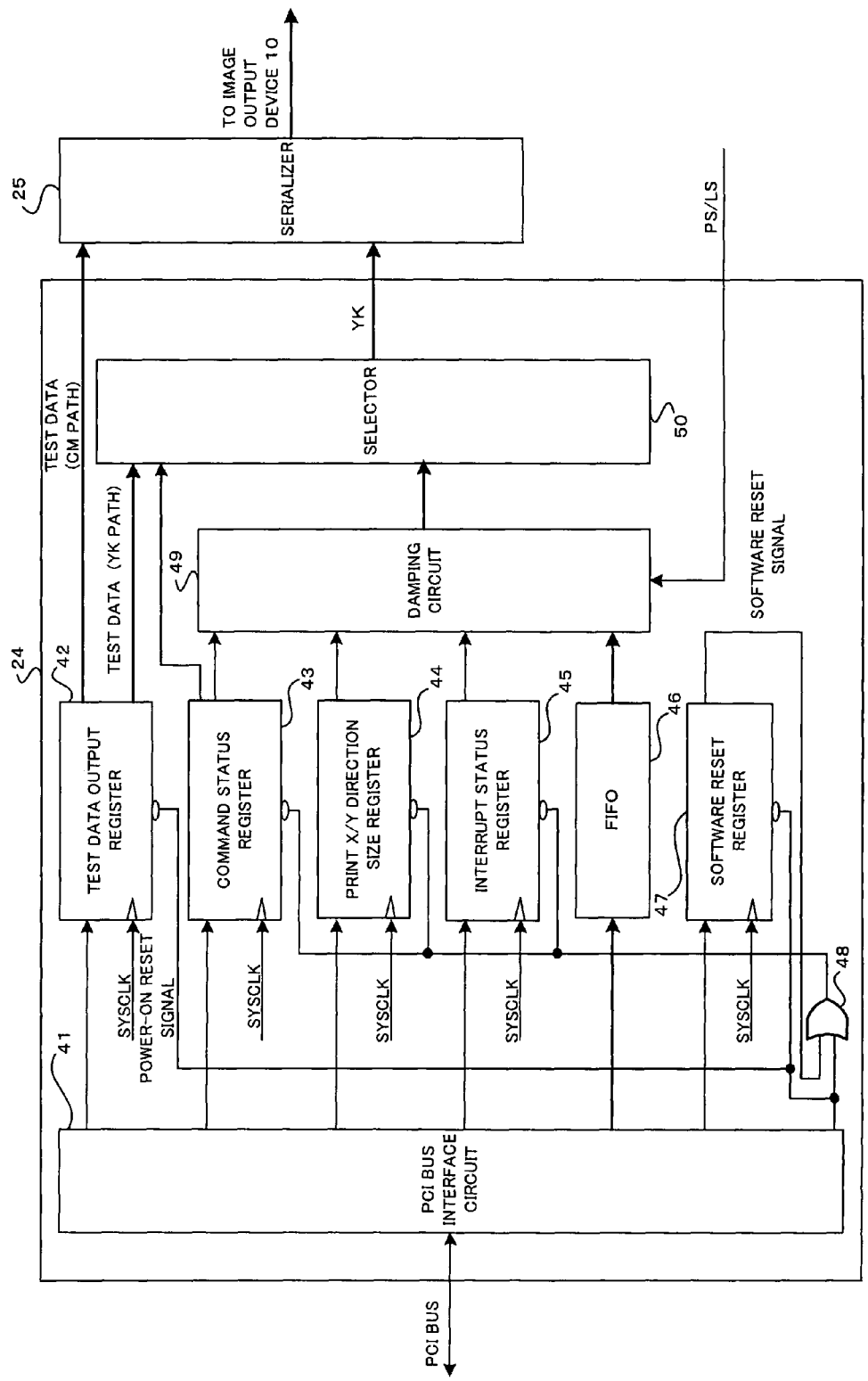
FIG. 3 is a block diagram showing the configuration of a transmission/reception controller 24.

Next, FIG. 3 is a block diagram showing the configuration of the transmission/reception controller 24.

When color printing is performed, the controller 12 transmits CMYK (cyan, magenta, yellow and black) 4-color image data to the image output device 10.

In the image forming system according to the exemplary embodiment, as 4-color image data is serialized and transmitted from the controller 12 to the image output device 10, a serial communication line used for transmission of the respective color image data is referred to as a path.

Note that in the present exemplary embodiment, a path for transmission of CM (cyan and magenta) image data (hereinbelow, referred to as a "CM path") and a path for transmission of YK (yellow and black) image data (hereinbelow, referred to as a "YK path") are independent paths for the sake of circuit configuration, however, the present invention is not limited to this configuration.

As shown in FIG. 3, the transmission/reception controller 24 has a PCI bus interface circuit 41, a test data output register 42, a command status register 43, a print X/Y direction size register 44, an interrupt status register 45, a FIFO memory 46, a software reset register 47, an OR circuit 48, a damping circuit 49, and a selector 50.

The PCI bus interface circuit 41 performs interface processing with respect to the PCI bus.

The test data output register 42 holds test data selected from plural types of prepared test data.

Note that two types of modes, a diagnostic test performed immediately after power-on and a link fail check for monitoring occurrence of communication abnormality during execution of a print job, are set as test modes performed between the controller 12 and the image output device 10. Since the diagnostic test and the link fail check are different types of tests and have different purposes, checking is reliably performed by changing the type of test data.

The command status register 43 is used for storing and output of various commands. The print X/Y direction size register 44 is used for storing and output of X-directional size and Y-directional size of an image to be print-outputted. The interrupt status register 45 is used for storing and output of a signal indicating interruptible/uninterruptible status.

The FIFO memory 46 is used for sequentially storing and outputting image data to be transmitted to the image output device 10.

The software reset register 47 outputs a signal (software reset signal) indicating software reset (initialization by software) inputted via the PCI bus to the OR circuit 48.

The OR circuit 48 calculates a logical OR between a power-on reset signal inputted via the PCI bus interface circuit 41 and the software reset signal outputted from the software reset register 47, and outputs the result of calculation to reset terminals of the command status register 43, the print X/Y direction size register 44 and the interrupt status register 45.

That is, the command status register 43, the print X/Y direction size register 44 and the interrupt status register 45 are reset (initialized) when power-on reset or software reset is performed. On the other hand, the test data output register 42 holding test data is not reset upon execution of software reset, but is reset only upon execution of power-on reset.

In the above arrangement, the OR circuit 48 functions as an initialization unit which does not perform initialization on the test data output register 42 but performs initialization on the other circuits than the test data output register 42 upon execution of software reset.

The damping circuit 49 outputs image data, read from the FIFO memory 46 based on the PS/LS signal from the deserializer 26, to the selector 50.

The selector 50 selects test data from the test data output register 42 (YK path) or the image data from the damping circuit 49 in accordance with a selection signal from the command status register 43, and outputs the selected data to the serializer 25.

Upon execution of the diagnostic test immediately after power-on, the selector 50 is controlled by the selection signal from the command status register 43 to select the test data from the test data output register 42 (YK path). Upon normal print processing, the selector 50 is controlled by the selection signal from the command status register 43 to select the image data from the damping circuit 49.

That is, upon execution of the diagnostic test, the serializer 25 serializes the test data (both CM path and YK path) and outputs the serialized test data to the image output device 10, while upon normal print processing, the serializer 25 serializes the test data on the CM path and the image data on the YK path and transmits the serialized data to the image output device 10.

In this manner, in the present exemplary embodiment, in the image forming system in which 4 paths are set for four colors of CMYK, when monochrome printing using only K (black) image data is performed, test data is transmitted, on a path which is not used (CM path), from the controller 12 to the image output device 10. Note that in the present exemplary embodiment, a path for transmission of Y (yellow) image data is not used as a path for transmission of test data, since it is also used for transmission of K image data for the sake of circuitry.

Next, the configuration of the reception abnormality monitor 33 in the image output device 10 will be described with reference to FIG. 4.

Figure 4:
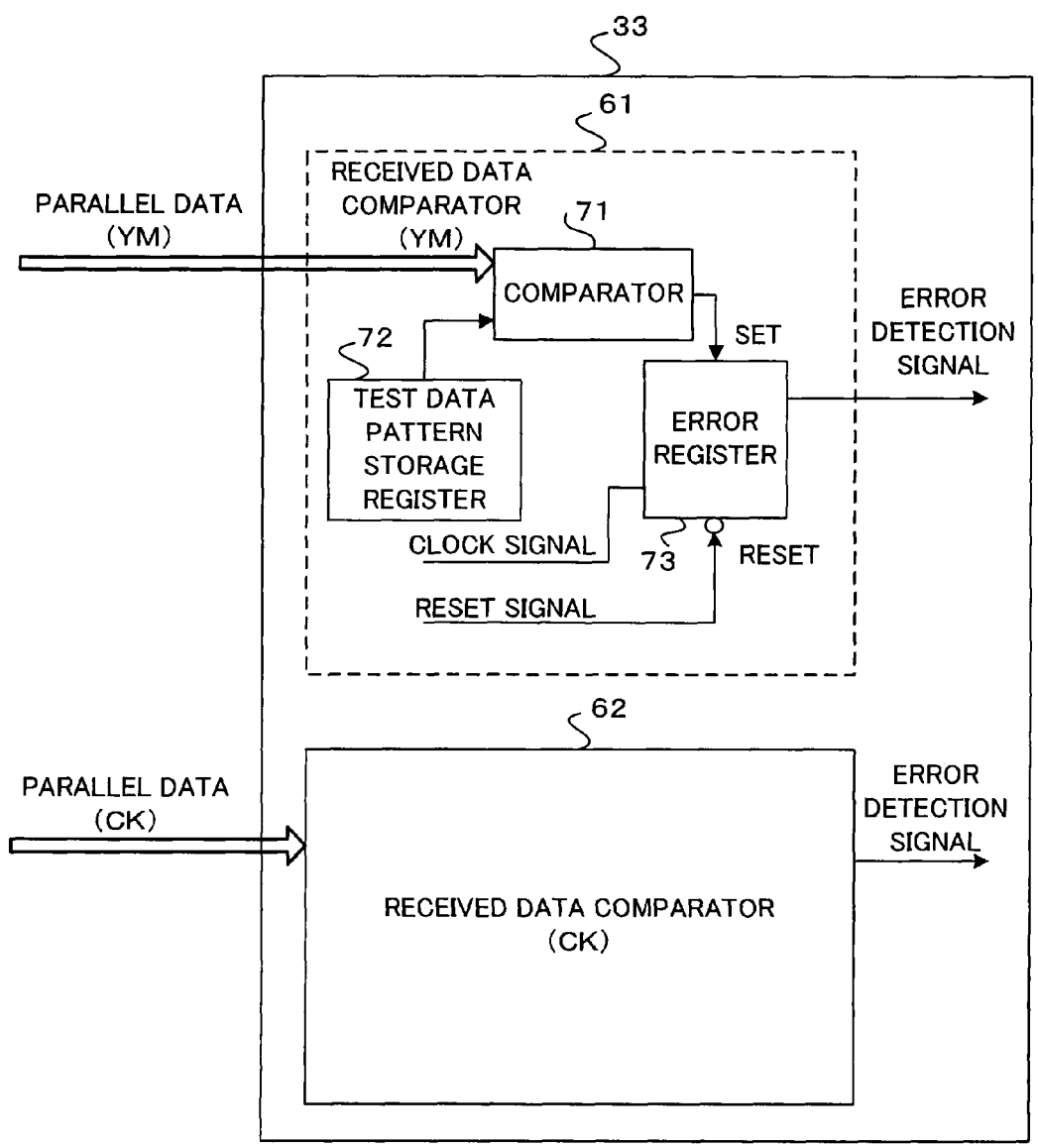
FIG. 4 is a block diagram showing the configuration of a reception abnormality monitor 33.

As shown in FIG. 4, the reception abnormality monitor 33 has a received data comparator (YM) 61 and a received data comparator (CK) 62.

Further, the received data comparator 61 has a comparator 71, a test data pattern storage register 72 and an error register 73. Note that as the configuration of the received data comparator 62 is basically the same as that of the received data comparator 61, the explanation of the received data comparator 62 will be omitted.

The received data comparator 61 determines occurrence/nonoccurrence of communication abnormality by comparing a pattern of test data transmitted via the YM path with a preset pattern.

Note that the received data comparator 62 determines occurrence/nonoccurrence of communication abnormality by comparing a pattern of test data transmitted via the CK path with a preset pattern. Note that since print image data is transmitted via the K path, the received data comparator 62 is used only upon diagnostic test immediately after power-on, but not used upon execution of link fail check.

The test data pattern storage register 72 holds a test data pattern transmitted from the controller 12 upon hand shaking before execution of test mode.

The comparator 71 compares a pattern of test data transmitted from the controller 12 via the YM path with the test data pattern stored in the test data pattern storage register 72, and when the patterns do not correspond with each other, sets the error register 73.

The error register 73, when set with an output from the comparator 71, turns an error detection signal to active, while when a reset signal is inputted, turns the error detection signal to inactive. More particularly, the error register 73 can be realized with a D-FF or the like.

In this circuit configuration, the comparator 71 and the error register 73 form a determination unit to determine occurrence/nonoccurrence of communication abnormality by comparing a pattern of test data in parallel data converted by the deserializer 31 with a preset pattern.

Next, the operation of the image forming system according to the present exemplary embodiment will be described in detail with reference to the drawings.

First, the operation of the image forming system upon power-on will be described.

When the power source is turned on, to establish a link, the controller 12 and the image output device 10 respectively perform a deskew operation to set an optimum clock phase between the serializers 25 and 32 and between the deserializers 31 and 26. The deskew operation is automatically performed between the serializers 25 and 32 and between the deserializers 26 and 32 by the CPUs 21 and 34 by setting respective deskew pins of the serializers 25 and 32 from a high level→a low level→the high level through I/O ports or the like.

Then, after the execution of the deskew operation, the diagnostic test is performed so as to check that the data line between the controller 12 and the image output device 10 is normal. In the diagnostic test, the controller 12 transmits test data for the YM path and the CK path to the image output device 10. In the image output device 10, it is checked whether or not a pattern of preset test data and that of the received test data correspond with each other. The image forming system according to the present exemplary embodiment becomes into an idle status through the diagnostic test, and ready for reception of print job.

Before the start of the test mode to perform the diagnostic test, hand shaking is performed between the controller 12 and the image output device 10 by communication.

Next, an operation upon monochrome printing using only K (black) image data will be described.

When monochrome printing is performed, the CPU 21 on the controller 12 generates a binary image to be print-outputted on the image memory 22, and DMA (Direct Memory Access) transfers the image data on the image memory 22 to the transmission/reception controller 24 through the PCI bus. Prior to the image data transfer, the size of image to be drawn and other information are set for the command status register 43, the print X/Y direction size register 44, the interrupt status register 45 and the like shown in FIG. 3. Then, the CPU 21 activates the damping circuit 49 by use of the command status register 43.

When print processing based on the image data is performed, the image output device 10 recognizes the start of printing by communication between the controller 12 and the image output device 10, and outputs the PS/LS signal from the synchronization signal generator 35 to the controller 12. Then, the damping circuit 49 in the controller 12 transmits the image data from the FIFO memory 46 to the image output device 10 based on the PS/LS signal received from the image output device 10.

Next, an operation when link fail check is performed upon execution of monochrome printing as above will be described. FIG. 5 is a sequence flowchart showing operations between the controller 12 and the image output device 10 when link fail check is performed.

When link fail check is performed during normal print image data transmission on the CK path, the CPU 21 of the controller 12 stores test data for link fail check into the test data output register 42. Then the CPU 21 sets a link fail check start bit in the command status register 43. By the setting of the link fail check start bit, the start of the link fail check is notified from the controller 12 to the image output device 10 (S101).

Then, communication is performed between the serial communication controller 27 and the serial communication controller 37, thereby a pattern of the test data to be used is notified from the controller 12 to the image output device 10 (S102). In the image output device 10, the notified pattern of the test data is set in the test data pattern storage register 72. Then the image output device 10 notifies the controller 12 side of the completion of preparation of the link fail check (S103).

Then, when print start is notified from the controller 12 to the image output device 10 (S104), the synchronization signal generator 35 of the image output device 10 transmits the PS/LS signal (S105). Then the controller 12 serializes the image data to be print-outputted by the serializer 25 and transmits the serialized image data to the image output device 10. Then, with the image data, the test data from the test data output register 42 is also serialized and transmitted on the CM path to the image output device 10 (S106).

In this manner, printing is performed in the image output device 10. When printing for one page in the print job has been completed, the controller 12 requests a check result of the link fail check from the image output device 10 (S107). Then, the image output device 10 returns the result of determination as to whether or not a reception abnormality has been detected during the printing for one page, i.e., whether or not the error detection signal from the received data comparator 61 has become active, to the controller 12 (S108).

This operation is repeated by the completion of the print job. The occurrence/nonoccurrence of reception abnormality is checked upon completion of one page printing. Then, when the print job has been completed, controller software of the CPU 21 performs software reset. However, since only the power-on reset signal is inputted in the test data output register 42, only the command status register 43, the print X/Y direction size register 44 and the interrupt status register 45 are initialized. Accordingly, the test data stored in the test data output register 42 is held.

In the above exemplary embodiment, image data is transmitted/received between the controller 12 and the image output device 10. However, the present invention is not limited to this arrangement. The present invention is applicable to any image data transmission system as long as the system has a transmission device to transmit image data and a reception device to receive the image data from the transmission device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transmission device comprising:
    a test data output register that holds test data used for checking occurrence/nonoccurrence of a communication abnormality;
    a serial conversion unit that converts image data to be transmitted and the test data stored in the test data output register into serial data;
    a transmission unit that transmits the serial data converted by the serial conversion unit to a reception device; and
    an initialization unit that, when software reset by a controller software is inputted, performs initialization on all registers other than the test data output register without performing initialization on the test data output register.

2. The transmission device according to claim 1, wherein the serial conversion unit converts the test data stored in the test data output register, using a path not used in transmission/reception of the image data to be transmitted, into serial data.

3. The transmission device according to claim 1,
    wherein the image data is black image data, and
    the serial conversion unit converts the test data stored in the test data output register, using a path allocated to other image data than the black image data, into serial data.

4. An image data transmission system comprising:
    a transmission device having:
        a test data output register that holds test data used for checking occurrence/nonoccurrence of a communication abnormality;
        a serial conversion unit that converts image data to be transmitted and the test data stored in the test data output register into serial data;
        a transmission unit that transmits the serial data converted by the serial conversion unit to a reception device; and
        an initialization unit that, when software reset by a controller software is inputted, performs initialization on all registers other than the test data output register without performing initialization on the test data output register, and
    a reception device having:
        a parallel conversion unit that converts the serial data transmitted from the transmission device into parallel data;
        a storage unit that previously holds test data to be transmitted; and
        a determination unit that determines occurrence/nonoccurrence of a communication abnormality by comparing a pattern of the test data in the parallel data converted by the parallel conversion unit with a pattern of the test data stored in the storage unit.

5. The image data transmission system according to claim 4, wherein the serial conversion unit converts the test data stored in the test data output register, using a path not used in transmission/reception of the image data to be transmitted, into serial data.

6. The image data transmission system according to claim 4,
wherein the image data is black image data, and
the serial conversion unit converts the test data stored in the test data output register, using a path allocated to other image data than the black image data, into serial data.

7. A transmission method comprising:
storing test data used for checking occurrence/nonoccurrence of a communication abnormality in a test data output register,
converting image data to be transmitted and the test data stored in the test data output register into serial data;
transmitting the serial data to a reception device; and
performing initialization on all registers other than the test data output register without performing initialization on the test data output register based on software reset by a controller software.

* * * * *

UNITED STATES PATENT AND TRADEMARK OFFICE
CERTIFICATE OF CORRECTION

PATENT NO. : 8,245,089 B2
APPLICATION NO. : 11/819090
DATED : August 14, 2012
INVENTOR(S) : Masatomo Igarashi Page 1 of 1

It is certified that error appears in the above-identified patent and that said Letters Patent is hereby corrected as shown below:

Title page insert between lines (22) and (65) the following:

-- (30) Foreign Application Priority Data

November 24, 2006   [JP]................2006-316649 --

Signed and Sealed this
Twenty-third Day of October, 2012

David J. Kappos
*Director of the United States Patent and Trademark Office*